(12) United States Patent
Wei et al.

(10) Patent No.: US 11,736,584 B2
(45) Date of Patent: Aug. 22, 2023

(54) PROXY END REGISTRATION METHOD, SYSTEM, AND RELATED APPARATUS

(71) Applicant: SHANDONG YINGXIN COMPUTER TECHNOLOGIES CO., LTD., Shandong (CN)

(72) Inventors: Zhiwei Wei, Shandong (CN); Peng Zhen, Shandong (CN)

(73) Assignee: SHANDONG YINGXIN COMPUTER TECHNOLOGIES CO., LTD., Shandong (CN)

( * ) Notice: Subject to any disclaimer, the term of this patent is extended or adjusted under 35 U.S.C. 154(b) by 0 days.

(21) Appl. No.: 17/780,224

(22) PCT Filed: Aug. 25, 2020

(86) PCT No.: PCT/CN2020/110979
§ 371 (c)(1),
(2) Date: May 26, 2022

(87) PCT Pub. No.: WO2021/135282
PCT Pub. Date: Jul. 8, 2021

(65) Prior Publication Data
US 2022/0417344 A1 Dec. 29, 2022

(30) Foreign Application Priority Data
Dec. 31, 2019 (CN) .......... 201911411052.7

(51) Int. Cl.
*H04L 67/56* (2022.01)
*G06F 9/455* (2018.01)
(Continued)

(52) U.S. Cl.
CPC .......... *H04L 67/56* (2022.05); *G06F 9/45558* (2013.01); *H04L 9/0643* (2013.01); *H04L 61/30* (2013.01); *H04L 67/145* (2013.01)

(58) Field of Classification Search
CPC ....... H04L 67/56; H04L 9/0643; H04L 61/30; H04L 67/145; G06F 9/45558
See application file for complete search history.

(56) References Cited

U.S. PATENT DOCUMENTS 8,543,781 B2    9/2013  Rawat et al.
8,949,827 B2 *  2/2015  Becker ................ G06F 9/45558
                                                    718/1
(Continued)

FOREIGN PATENT DOCUMENTS

CN    101800763 A    8/2010
CN    103034523 A    4/2013
(Continued)

OTHER PUBLICATIONS

International Search Report of corresponding PCT application PCT/CN2020/110979, dated Nov. 13, 2020, 5 pages.
(Continued)

Primary Examiner — Ramy M Osman
(74) Attorney, Agent, or Firm — Cooper Legal Group, LLC

(57) ABSTRACT

Provided are a proxy end registration method, a proxy end registration system, a computer-readable memory medium, and a terminal. The method includes: receiving, by a management end, heartbeat information sent by a proxy end, and determining whether a management end database contains a UUID in the heartbeat information, wherein the heartbeat information is generated according to a MAC address of the proxy end and timestamp information; if not, determining whether a first hash counter in the heartbeat information is 0, the first hash counter being used for indicating a heartbeat IP transformation state of the heartbeat information; if the
(Continued)

first hash counter is not 0, notifying the proxy end of the need to re-register; or if the first hash counter is 0, allowing the proxy end to register.

18 Claims, 2 Drawing Sheets

(51) Int. Cl.
    *H04L 9/06* (2006.01)
    *H04L 61/30* (2022.01)
    *H04L 67/145* (2022.01)

(56) References Cited

U.S. PATENT DOCUMENTS

| | | | |
|---|---|---|---|
| 10,180,851 B2* | 1/2019 | Haag | G06F 9/45558 |
| 10,338,964 B1 | 7/2019 | Kancharla et al. | |
| 10,754,789 B1* | 8/2020 | Volpe | G06F 12/08 |
| 2003/0026230 A1* | 2/2003 | Ibanez | H04L 61/5046 370/475 |
| 2008/0134175 A1* | 6/2008 | Fitzgerald | G06F 9/45558 718/1 |
| 2009/0182928 A1* | 7/2009 | Becker | G06F 9/45558 718/1 |
| 2009/0183173 A1* | 7/2009 | Becker | G06F 9/45533 719/313 |
| 2010/0017409 A1 | 1/2010 | Rawat et al. | |
| 2010/0118750 A1* | 5/2010 | Iwasa | H04W 40/24 370/445 |
| 2010/0122248 A1* | 5/2010 | Robinson | G06F 9/5077 718/1 |
| 2011/0119748 A1* | 5/2011 | Edwards | G06F 9/45558 718/1 |
| 2011/0238820 A1* | 9/2011 | Matsuoka | G06F 9/5077 709/224 |
| 2013/0247045 A1 | 9/2013 | Fitzgerald et al. | |
| 2014/0137272 A1* | 5/2014 | Baset | G06F 21/566 726/32 |
| 2014/0201732 A1* | 7/2014 | Haag | G06F 9/45533 718/1 |
| 2014/0223431 A1* | 8/2014 | Yoshimura | G06F 9/45533 718/1 |
| 2014/0229933 A1* | 8/2014 | Kanungo | G06F 9/45558 718/1 |
| 2016/0266924 A1* | 9/2016 | Iyobe | G06F 9/45558 |
| 2017/0177840 A1* | 6/2017 | Srivastava | H04L 63/20 |
| 2017/0257392 A1 | 9/2017 | Ghosh et al. | |
| 2018/0181439 A1 | 6/2018 | Jackson et al. | |
| 2019/0132278 A1* | 5/2019 | Mittal | H04L 61/103 |
| 2021/0064411 A1* | 3/2021 | Tsuji | G06F 9/45558 |
| 2022/0417344 A1* | 12/2022 | Wei | H04L 67/56 |

FOREIGN PATENT DOCUMENTS

| | | |
|---|---|---|
| CN | 104054322 A | 9/2014 |
| CN | 104142848 A | 11/2014 |
| CN | 106250210 A | 12/2016 |
| CN | 106790167 A | 5/2017 |
| CN | 108924087 A | 11/2018 |
| CN | 109697109 A | 4/2019 |
| CN | 110932845 A | 3/2020 |

OTHER PUBLICATIONS

Written Opinion of International Searching Authority of corresponding PCT application PCT/CN2020/110979, dated Nov. 13, 2020, 9 pages.

First Office Action of corresponding CN priority application CN201911411052.7, dated Apr. 25, 2021, 9 pages.

* cited by examiner

PROXY END REGISTRATION METHOD, SYSTEM, AND RELATED APPARATUS

The present application claims priority to Chinese Patent Application No. 201911411052.7, filed to the China Patent Office on Dec. 31, 2019, entitled "Proxy End Registration Method, System, and Related Apparatus", the entire contents of which are incorporated herein by reference.

FIELD

The present application relates to the field of authority management, and in particular to a proxy end registration method, system, and related apparatus.

BACKGROUND

A main form of security application of a Browser/Server (B/S) structure is that a management end manages multiple proxy ends simultaneously. An authorization certificate is imported through the management end. The management end continues to authorize the proxy ends. There are usually limitations in quantity, etc. In practical use, the proxy end may be a virtual machine. There is sometimes an operation of cloning the virtual machine. This operation completely clones the same virtual machine. Therefore, there will be two almost identical proxy ends except for an IP. However, since the IP is usually acquired dynamically by a Dynamic Host Configuration Protocol (DHCP) in a real environment, the IP is often changed and cannot be used as a unique identifier. Therefore, when the management end receives identical data, two clients may receive data. The authorization function of the management end cannot thus accurately control the number of proxy ends, resulting in loss.

SUMMARY

An object of the present application is to provide a proxy end registration method and system, a computer-readable memory medium, and a terminal, which can effectively resolve the problem of machine usage confusion caused by machine cloning.

In order to solve the above-described technical problem, the present application provides a proxy end registration method which is as follows:

receiving, by a management end, heartbeat information sent by a proxy end, and determining whether a management end database contains a Universally Unique Identifier (UUID) in the heartbeat information, wherein the heartbeat information is generated according to a Media Access Control (MAC) address of the proxy end and timestamp information;

if not, determining whether a first hash counter in the heartbeat information is 0, the first hash counter being configured to indicate a heartbeat IP transformation state of the heartbeat information;

if the first hash counter is not 0, notifying the proxy end of the need to re-register; or if the first hash counter is 0, allowing the proxy end to register.

If the management end database contains a UUID in the heartbeat information, the method further includes:

determining whether a heartbeat IP of the heartbeat information is the same as a heartbeat IP received previously;

if not, after the proxy end performs hash calculation on the UUID to obtain a second UUID, receiving the UUID and the second UUID, wherein the first hash counter is incremented by 1 upon each hash calculation of the proxy end.

After receiving the UUID and the second UUID, the method further includes:

performing hash calculation on the second UUID to obtain a new UUID, and incrementing a second hash counter by 1 upon each hash calculation;

when the second hash counter is equal to the first hash counter, determining whether the second UUID is the same as a third UUID which is currently subjected to hash calculation;

if so, updating the second UUID and a value of the first hash counter to the management end database; or if not, notifying the proxy end of the need to re-register.

Prior to re-registration of the proxy end, the method further includes:

deleting the UUID and the second UUID and resetting the first hash counter.

The performing hash calculation on the second UUID to obtain the new UUID includes:

after encrypting the second UUID using a preset symmetric algorithm, performing hash calculation to obtain the new UUID.

The proxy end communicates with the management end through rabbitmq (Rabbit Message Queue).

The present application also provides a proxy end registration system, including:

a first determination module, configured to receive heartbeat information sent by a proxy end, and determine whether a management end database contains a UUID in the heartbeat information, wherein the heartbeat information is generated according to a MAC address of the proxy end and timestamp information;

a second determination module, configured to determine, when a determination result of the first determination module is No, whether a first hash counter in the heartbeat information is 0, the first hash counter being configured to indicate a heartbeat IP transformation state of the heartbeat information;

a registration prohibition module, configured to notify, when a determination result of the second determination module is No, the proxy end of the need to re-register; or a registration allowing module, configured to allow, when the determination result of the second determination module is Yes, the proxy end to register.

The system further includes:

a third determination module, configured to: determine, when the determination result of the first determination module is Yes, whether a heartbeat IP of the heartbeat information is the same as a heartbeat IP received previously; if not, after the proxy end performs hash calculation on the UUID to obtain a second UUID, receive the UUID and the second UUID, wherein the first hash counter is incremented by 1 upon each hash calculation of the proxy end.

The present application also provides a computer-readable memory medium having, stored thereon, a computer program which, when executed by a processor, implements the steps of the method as described above.

The present application also provides a terminal, including a memory and a processor. A computer program is stored in the memory. The processor, when invoking the computer program in the memory, implements the steps of the method as described above.

The present application provides a proxy end registration method, including: receiving, by a management end, heartbeat information sent by a proxy end, and determining whether a management end database contains a UUID in the heartbeat information, wherein the heartbeat information is generated according to a MAC address of the proxy end and timestamp information; if not, determining whether a first hash counter in the heartbeat information is 0, the first hash counter being configured to indicate a heartbeat IP transformation state of the heartbeat information; if the first hash counter is not 0, notifying the proxy end of the need to re-register; or if the first hash counter is 0, allowing the proxy end to register.

According to the present application, by determining whether a UUID sent by a proxy end is the same as a database thereof, it is determined whether the proxy end has registered. If not, it is necessary to further distinguish whether the proxy end is a cloned machine according to the counting condition of a first hash counter. Since a MAC address of the cloned machine is the same but an IP address is different, it may be determined whether the proxy end is a cloned machine by determining a heartbeat IP of heartbeat information. If the first hash counter is 0, it is indicated that the proxy end is not a cloned machine and registration is allowed. According to the present application, the problem of multiple proxy ends using one authorization in a machine cloning scenario is effectively controlled, thereby protecting the authority and interests of manufacturers. The present application also provides a proxy end registration system, a computer-readable memory medium, and a terminal, which have the above-described beneficial effects. Detailed descriptions are omitted herein.

BRIEF DESCRIPTION OF THE DRAWINGS

In order to more clearly illustrate the technical solutions in the embodiments of the present application or the prior art, the drawings needing to be used in the description of the embodiments or the prior art will be briefly introduced below. It is obvious that the drawings in the following description are merely the embodiments of the present application. A person ordinarily skilled in the art may also obtain other drawings according to the provided drawings without involving any inventive effort.

DETAILED DESCRIPTION

In order that the objects, technical solutions and advantages of the embodiments of the present application will become more apparent, the technical solutions in the embodiments of the present application will now be described clearly and completely with reference to the accompanying drawings in the embodiments of the present application. It is obvious that the described embodiments are merely some, but not all, embodiments of the present application. All other embodiments obtained by a person ordinarily skilled in the art based on the embodiments in the present application without involving creative efforts fall within the scope of protection of the present application.

Figure 1:
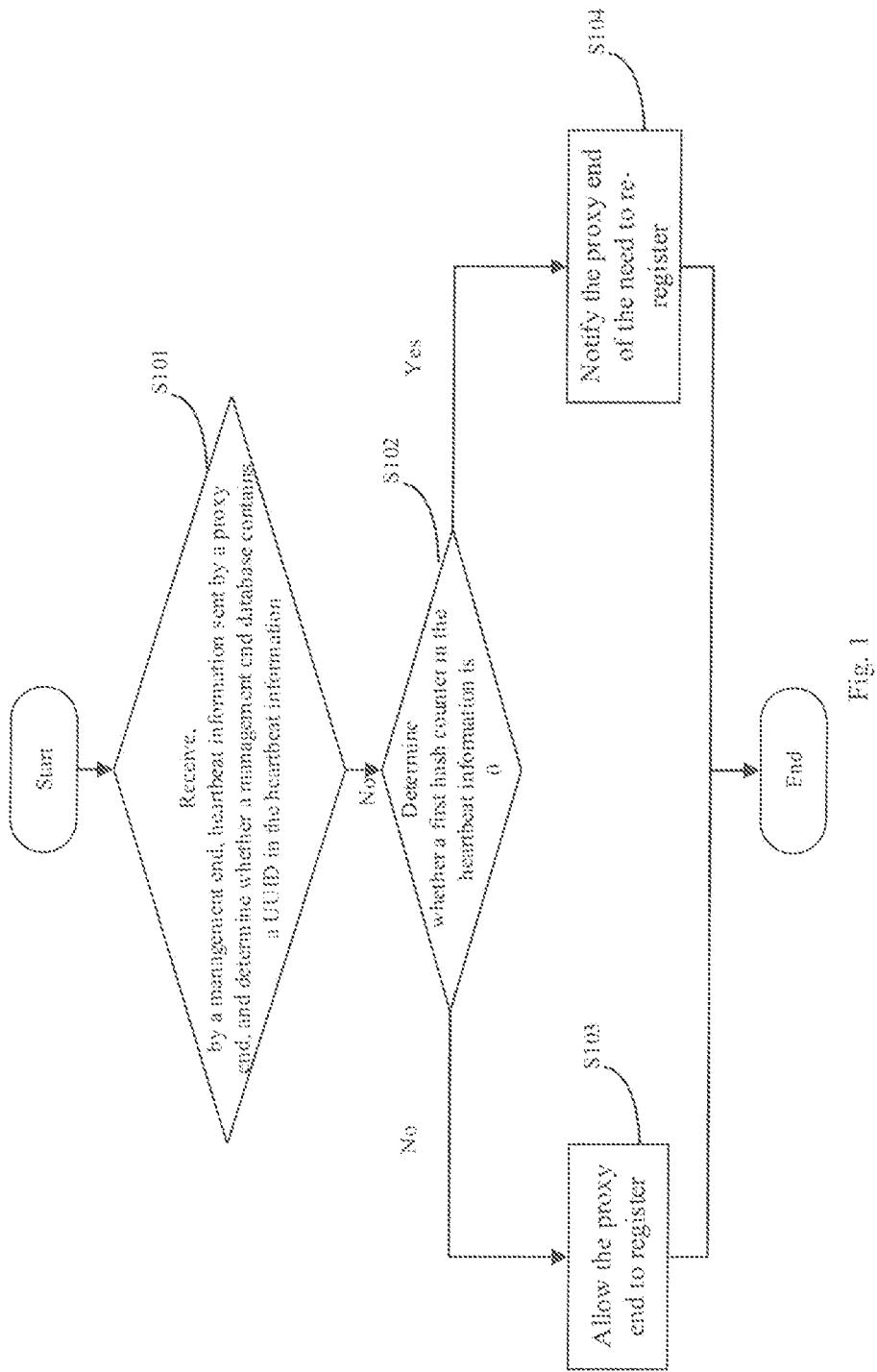
FIG. 1 is a flowchart of a proxy end registration method according to an embodiment of the present application.

Referring to FIG. 1, FIG. 1 is a flowchart of a proxy end registration method according to an embodiment of the present application. The method includes the following steps.

In S101, a management end receives heartbeat information sent by a proxy end, and determines whether a management end database contains a UUID in the heartbeat information. If not, the method proceeds to S102.

In the embodiments of the present application, the management end refers to a web system capable of managing multiple proxy ends simultaneously. An online state of the proxy ends is maintained through heartbeat information. Data interaction between a control end and the proxy ends is completed through a communication component, such as rabbitmq. The proxy end mainly refers to a server or host installed with a proxy program for specifically performing service processing. The heartbeat information is a message sent or received periodically, and it is verified whether the message content is correct. If the message content is correct, it is indicated that the heartbeat is valid and the proxy end is online.

The heartbeat information needs to be generated according to a MAC address and timestamp information. Therefore, the management end may distinguish different proxy ends according to the MAC address, and even if the proxy ends are the same, since timestamps when interacting with the management end are different, the heartbeat information sent each time is different.

If the heartbeat information exists in the management end database, it means that proxy end devices having the same MAC address generate the UUID at the same timestamp and send the UUID to the management end. Usually, this case is that the proxy ends are reconnected after being offline. That is, the proxy end is re-connected with the management end after being offline. The UUID sent to the management end by the proxy end is the last UUID reserved before being offline, indicating that the proxy end has registered, is only re-connected with the management end, and does not need to re-register.

In S102, it is determined whether a first hash counter in the heartbeat information is 0. If not, the method proceeds to S103. Alternatively, if so, the method proceeds to S104.

However, when the management end database does not contain a UUID in the heartbeat information, there is a possibility of machine cloning. For the management end, cloned machines have the same MAC address. Once the heartbeat information is generated at the same time, the obtained heartbeat information is also the same. Therefore, when the management end distinguishes the proxy ends according to the MAC address, the proxy end devices which cannot satisfy original requirements are connected simultaneously. For example, the management end may be connected with five proxy ends A, B, C, D and E simultaneously. However, once there are cloned proxy ends in the five proxy ends in an original target, there are A1 and A2 as cloned ends of A. Since the MAC addresses are the same, A1 and A2 may be connection targets of the management end, which would certainly affect connection of the proxy ends B, C, D, and E with the management end.

Therefore, even if the management end database does not contain a UUID in the heartbeat information, it cannot be directly determined whether the proxy end is a new proxy end. At this moment, it may be determined whether a first hash counter in the heartbeat information is 0. The first hash counter is a counter of the proxy end for indicating a heartbeat IP transformation state of the heartbeat information. Specifically, the first hash counter is incremented by 1 whenever the proxy end calculates the UUID to obtain a new UUID for connecting with the management end.

In S103, if the first hash counter is not 0, the proxy end is notified of the need to re-register.

When the management end database does not contain the UUID, but the first hash counter is not 0, the proxy end is considered to be a cloned proxy end. At this moment, the proxy end needs to re-register. After re-registration, it is differentiated from the UUID of the cloned proxy end.

In S104, if the first hash counter is 0, the proxy end is allowed to register.

When the management end database does not contain the UUID, and the first hash counter is 0, the proxy end is considered not to be a cloned proxy end. Therefore, the proxy end is allowed to register.

According to the embodiments of the present application, by determining whether a UUID sent by a proxy end is the same as a database thereof, it is determined whether the proxy end has registered. If not, it is necessary to further distinguish whether the proxy end is a cloned machine according to the counting condition of a first hash counter. Since a MAC address of the cloned machine is the same but an IP address is different, it may be determined whether the proxy end is a cloned machine by determining a heartbeat IP of heartbeat information. If the first hash counter is 0, it is indicated that the proxy end is not a cloned machine and registration is allowed.

According to the present application, the problem of multiple proxy ends using one authorization in a machine cloning scenario is effectively controlled, thereby protecting the authority and interests of manufacturers.

On the basis of the above-described embodiments, the management end database contains a UUID in the heartbeat information. The method may further include the following steps.

It is determined whether a heartbeat IP of the heartbeat information is the same as a heartbeat IP received previously.

If not, after the proxy end performs hash calculation on the UUID to obtain a second UUID, the UUID and the second UUID are received. The first hash counter is incremented by 1 upon each hash calculation of the proxy end.

When the UUID exists in the management end database, it is determined whether both of heartbeat information have the same heartbeat IP. If different proxy ends perform hash calculation on the UUID to obtain a second UUID, both the UUID and the second UUID are sent to the management end.

However, the management end does not calculate the UUID and only performs hash calculation on the second UUID to obtain a new UUID, and a second hash counter in the management end is incremented by 1 upon each hash calculation.

When the second hash counter is equal to the first hash counter, it is determined whether the second UUID is the same as a third UUID which is currently subjected to hash calculation.

If so, the second UUID and a value of the first hash counter are updated to the management end database.

If not, the proxy end is notified of the need to re-register.

In the embodiments of the present application, on the basis of the above-described embodiments, although a cloning device of the proxy end is prohibited from registering in the previous embodiment, once the cloning device generates a UUID at different timestamps with a cloned end, the management end will falsely identify. Therefore, the management end needs to perform the same number of hash calculations as the proxy end to avoid the cloning end spoofing the management end by generating a UUID different from the cloned end at another time. Since the cloning end and the cloned end have the same initial UUID, UUIDs obtained by performing the same number of calculations on the initial UUIDs should be the same. Therefore, the embodiments of the present application can realize second prohibition of the cloning end after the first registration prohibition.

On the basis of the above-described embodiments, prior to re-registration of the proxy end, the method further includes the following steps.

The UUID and the second UUID are deleted, and the first hash counter is reset.

Since the cloning end and the cloned end have the same initial UUID, in order to avoid the situation described in the previous embodiment, the cloned proxy end needs to delete the UUID and the second UUID stored therein, and the first hash counter is reset. Meanwhile, a new MAC address is needed therefor to distinguish from other proxy ends, so as to ensure that false identification and connection of the management end can be avoided.

On the basis of the above-described embodiments, as a more preferred embodiment, regardless of hash calculation on the proxy end or on the management end, a preset symmetric algorithm may be used for encryption first and then hash calculation may be performed. For example, the management end may encrypt the second UUID using the preset symmetric algorithm, and the proxy end may encrypt the UUID using the preset symmetric algorithm. The preset algorithm is not limited herein and may be AES encryption or the like.

A proxy end registration system according to an embodiment of the present application is described below. The proxy end registration system described below and the proxy end registration method described above may be referred to correspondingly.

Figure 2:
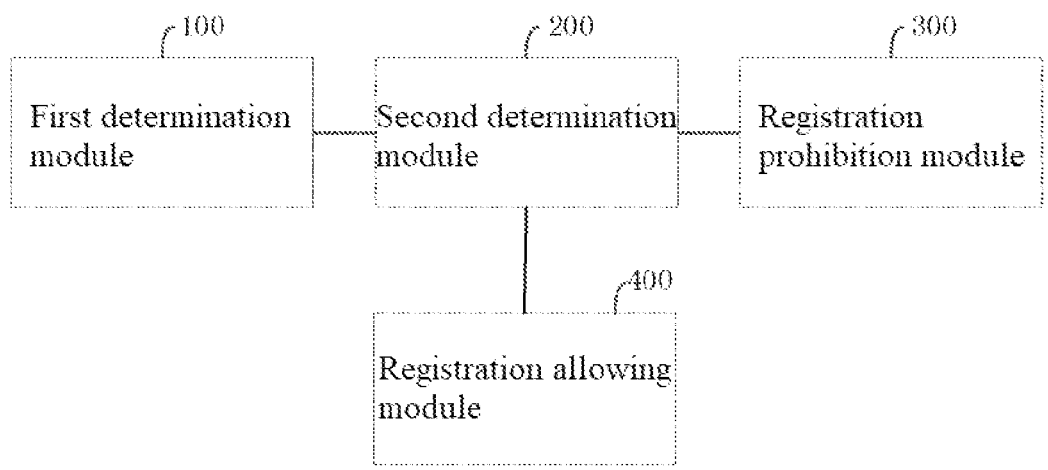
FIG. 2 is a structural schematic diagram of a proxy end registration system according to an embodiment of the present application.

Referring to FIG. 2, FIG. 2 is a flowchart of a proxy end registration method according to an embodiment of the present application. The present application also provides a proxy end registration system, including:

a first determination module 100, configured to receive heartbeat information sent by a proxy end, and determine whether a management end database contains a UUID in the heartbeat information, wherein the heartbeat information is generated according to a MAC address of the proxy end and timestamp information;

a second determination module 200, configured to determine, when the determination result of the first determination module is No, whether a first hash counter in the heartbeat information is 0, the first hash counter being configured to indicate a heartbeat IP transformation state of the heartbeat information;

a registration prohibition module 300, configured to notify, when the determination result of the second determination module is No, the proxy end of the need to re-register; or a registration allowing module 400, configured to allow, when the determination result of the second determination module is Yes, the proxy end to register.

On the basis of the above-described embodiments, as a preferred embodiment, the system may further include:

a third determination module, configured to: determine, when the determination result of the first determination module is Yes, whether a heartbeat IP of the heartbeat information is the same as a heartbeat IP received previously; and if not, after the proxy end performs hash calculation on the UUID to obtain a second UUID, receive the UUID and the second UUID, wherein the first hash counter is incremented by 1 upon each hash calculation of the proxy end.

The present application also provides a computer-readable memory medium having, stored thereon, a computer program which, when executed, performs the steps provided by the above-described embodiments. The memory medium may include: a USB flash disk, a removable hard disk, a Read-Only Memory (ROM), a Random Access Memory (RAM), a magnetic disk, or an optical disk, and other medium which may store program codes.

The present application also provides a terminal, which may include a memory and a processor. A computer program is stored in the memory. The processor, when invoking the computer program in the memory, may implement the steps provided by the above-described embodiments. Of course, the terminal may further include various network interfaces, a power supply, and other components.

Various embodiments are described in the description in a progressive manner. Each embodiment focuses on differences from the other embodiments. The same or similar parts of the various embodiments may be referred to each other. As to the system provided by the embodiments, since the system corresponds to the method provided by the embodiments, the description is relatively simple. The relevant part may be described with reference to the method section.

The principles and implementations of the present application have been set forth herein using specific examples. The above-described embodiments have been set forth only to aid in the understanding of the method and core ideas of the present application. It should be noted that a person ordinarily skilled in the art may make numerous improvements and modifications to the present application without departing from the principles of the present application. Such improvements and modifications are intended to be within the scope of protection of the appended claims of the present application.

It should also be noted that the relational terms such as first and second in the present description are used solely to distinguish one entity or operation from another without necessarily requiring or implying any actual such relationship or order between such entities or operations. Moreover, the terms "include", "contain", or any other variations thereof are intended to cover a non-exclusive inclusion, such that a process, method, article, or device including a series of elements not only includes those elements, but also includes other elements that are not explicitly listed, or also includes elements inherent to such process, method, article, or device. It is not excluded, without more constraints, that additional identical elements exist in the process, method, article, or device including elements defined by a sentence "including a . . . ".

The invention claimed is:

1. A proxy end registration method, comprising:
receiving, by a management end, heartbeat information sent by a proxy end, and determining whether a management end database contains a Universally Unique Identifier (UUID) contained in the heartbeat information, wherein the heartbeat information is generated at the proxy end and according to a Media Access Control (MAC) address of the proxy end and timestamp information;
in response to the management end database containing the UUID in the heartbeat information:
 determining whether a heartbeat Internet Protocol (IP) address of the heartbeat information is the same as a heartbeat IP address received previously;
 in response to both heartbeat IP addresses not being the same, performing, by the proxy end, a hash calculation on the UUID to obtain a second UUID, and receiving, by the management end, the second UUID;
 performing hash calculation on the second UUID to obtain a new UUID, and incrementing a second hash counter by 1 upon each hash calculation; and
 when the second hash counter is equal to a first hash counter in the heartbeat information, determining whether the second UUID is the same as a third UUID which is currently subjected to hash calculation, the first hash counter being configured to indicate a heartbeat IP address transformation state of the heartbeat information;
in response to the management end database not containing the UUID in the heartbeat information, determining whether the first hash counter in the heartbeat information is 0;
in response to the first hash counter not being 0, notifying the proxy end of a need to re-register; and
in response to the first hash counter being 0, allowing the proxy end to register.

2. The proxy end registration method according to claim 1, wherein the first hash counter is incremented by 1 upon each hash calculation performed by the proxy end.

3. The proxy end registration method according to claim 2, wherein after determining whether the second UUID is the same as the third UUID which is currently subjected to hash calculation, the method further comprises:
in response to the second UUID and the third UUID being the same, updating the second UUID and a value of the first hash counter to the management end database; and
in response to the second UUID and the third UUID being different, notifying the proxy end of the need to re-register.

4. The proxy end registration method according to claim 3, wherein prior to re-registration of the proxy end, the method further comprises:
deleting the UUID and the second UUID and resetting the first hash counter.

5. The proxy end registration method according to claim 3, wherein the performing hash calculation on the second UUID to obtain the new UUID comprises:
after encrypting the second UUID using a preset symmetric algorithm, performing hash calculation to obtain the new UUID.

6. The proxy end registration method according to claim 1, wherein the proxy end communicates with the management end through rabbitmq.

7. A non-transitory computer-readable memory medium having, stored thereon, a computer program which, when executed by a processor, implements the steps of a proxy end registration method, comprising:
receiving, by a management end, heartbeat information sent by a proxy end, and determining whether a management end database contains a Universally Unique Identifier (UUID) contained in the heartbeat information, wherein the heartbeat information is generated at the proxy end and according to a Media Access Control (MAC) address of the proxy end and timestamp information;
in response to the management end database containing the UUID in the heartbeat information:
 determining whether a heartbeat Internet Protocol (IP) address of the heartbeat information is the same as a heartbeat IP address received previously;
 in response to both heartbeat IP addresses not being the same, performing, by the proxy end, a hash calculation on the UUID to obtain a second UUID, and receiving, by the management end, the second UUID;

performing hash calculation on the second UUID to obtain a new UUID, and incrementing a second hash counter by 1 upon each hash calculation; and when the second hash counter is equal to a first hash counter in the heartbeat information, determining whether the second UUID is the same as a third UUID which is currently subjected to hash calculation, the first hash counter being configured to indicate a heartbeat IP address transformation state of the heartbeat information;

in response to the management end database not containing the UUID in the heartbeat information, determining whether the first hash counter in the heartbeat information is 0;

in response to the first hash counter not being 0, notifying the proxy end of a need to re-register; and in response to the first hash counter being 0, allowing the proxy end to register.

8. The non-transitory computer-readable memory medium according to claim 7, wherein the first hash counter is incremented by 1 upon each hash calculation performed by the proxy end.

9. The non-transitory computer-readable memory medium according to claim 8, wherein the computer program, when executed by the processor, implements the steps of:

in response to the second UUID and the third UUID being the same, updating the second UUID and a value of the first hash counter to the management end database; and in response to the second UUID and the third UUID being different, notifying the proxy end of the need to re-register.

10. The non-transitory computer-readable memory medium according to claim 9, wherein the computer program, when executed by the processor, implements the steps of:

deleting the UUID and the second UUID and resetting the first hash counter.

11. The non-transitory computer-readable memory medium according to claim 9, wherein the computer program, when executed by the processor, implements the steps of:

after encrypting the second UUID using a preset symmetric algorithm, performing hash calculation to obtain the new UUID.

12. The non-transitory computer-readable memory medium according to claim 7, wherein the proxy end communicates with the management end through rabbitmq.

13. A terminal, comprising a memory and a processor, wherein a computer program is stored in the memory, and the processor, when invoking the computer program in the memory, implements the steps of a proxy end registration method, comprising:

receiving, by a management end, heartbeat information sent by a proxy end, and determining whether a management end database contains a Universally Unique Identifier (UUID) contained in the heartbeat information, wherein the heartbeat information is generated at the proxy end and according to a Media Access Control (MAC) address of the proxy end and timestamp information;

in response to the management end database containing the UUID in the heartbeat information:

determining whether a heartbeat Internet Protocol (IP) address of the heartbeat information is the same as a heartbeat IP address received previously;

in response to both heartbeat IP addresses not being the same, performing, by the proxy end, a hash calculation on the UUID to obtain a second UUID, and receiving, by the management end, the second UUID;

performing hash calculation on the second UUID to obtain a new UUID, and incrementing a second hash counter by 1 upon each hash calculation; and when the second hash counter is equal to a first hash counter in the heartbeat information, determining whether the second UUID is the same as a third UUID which is currently subjected to hash calculation, the first hash counter being configured to indicate a heartbeat IP address transformation state of the heartbeat information;

in response to the management end database not containing the UUID in the heartbeat information, determining whether the first hash counter in the heartbeat information is 0;

in response to the first hash counter not being 0, notifying the proxy end of a need to re-register; and in response to the first hash counter being 0, allowing the proxy end to register.

14. The terminal according to claim 13, wherein the first hash counter is incremented by 1 upon each hash calculation performed by the proxy end.

15. The terminal according to claim 14, wherein the processor, when invoking the computer program in the memory, implements the steps of:

in response to the second UUID and the third UUID being the same, updating the second UUID and a value of the first hash counter to the management end database; and in response to the second UUID and the third UUID being different, notifying the proxy end of the need to re-register.

16. The terminal according to claim 15, wherein the processor, when invoking the computer program in the memory, implements the steps of:

deleting the UUID and the second UUID and resetting the first hash counter.

17. The terminal according to claim 15, wherein the processor, when invoking the computer program in the memory, implements the steps of:

after encrypting the second UUID using a preset symmetric algorithm, performing hash calculation to obtain the new UUID.

18. The terminal according to claim 13, wherein the proxy end communicates with the management end through rabbitmq.

* * * * *